United States Patent [19]

Nepote

[11] 3,906,816

[45] Sept. 23, 1975

[54] FISHING REEL WITH A DISENGAGEABLE ONE-WAY PAWL AND RATCHET MECHANISM

[75] Inventor: Alain Nepote, Cluses, France

[73] Assignee: Mitchell S.A., France

[22] Filed: Aug. 30, 1974

[21] Appl. No.: 502,183

[30] Foreign Application Priority Data
Oct. 23, 1973  France .............................. 73.37764

[52] U.S. Cl. ...................... 74/575; 74/97; 74/577 S; 188/82.3; 188/82.7; 242/84.21 R
[51] Int. Cl.[2] .......................................... G05G 5/00
[58] Field of Search ........ 74/577 S, 577 R, 575, 97; 242/84.2 R, 84.21 R, 84.26; 188/82.3, 82.34, 82.7

[56] References Cited
UNITED STATES PATENTS
2,964,257  12/1960  Hull .............................. 188/82.7 X FOREIGN PATENTS OR APPLICATIONS
1,406,696  6/1965  France .......................... 242/84.21 R Primary Examiner—Samuel Scott
Assistant Examiner—F. D. Shoemaker
Attorney, Agent, or Firm—Robert E. Burns; Emmanuel J. Lobato; Bruce L. Adams

[57] ABSTRACT

A one-way pawl and ratchet mechanism of a fishing reel comprises a pawl able to cooperate with a ratchet and an external control lever. The pawl and the control lever are pivotally mounted about a common axis. An extension spring connected at one end to a piece carried by the lever and at the other end to the pawl constantly holds the pawl engaged or disengaged according to the position of the lever.

3 Claims, 4 Drawing Figures

FISHING REEL WITH A DISENGAGEABLE ONE-WAY PAWL AND RATCHET MECHANISM

The invention relates to pawl and ratchet devices for controlling one-way rotation in fishing reels.

In a known fishing reel, a pawl pivotally mounted on the casing is held by a spring either engaged with a ratchet connected to the reel to allow one-way rotation thereof, or disengaged from the ratchet and bearing against a fixed stop. An external control button, pivotally mounted on the casing about an axis spaced well apart from that of the pawl, is associated with an internal lever connected to the same spring as holds the pawl. This spring is in the form of a bent wire and forms an elastic liaison between the control button and the pawl to enable the pawl to be engaged or disengaged at will by rotation of the button. This arrangement has an important feature absent in earlier reels in which the control button was integral with or pivotally mounted together with the pawl, namely that when the fishing line is under tension and the pawl is engaged with the ratchet, it is possible to move the control button to the "disengaged" position by exerting a slight force thereon, the pawl remaining engaged with the ratchet until the line tension drops. In the referred to earlier devices, the same manipulation involved a large force on the control button sufficient to disengage the pawl, and risked breakage of an element. However, this advantage is obtained at the cost of a considerable increase in the volume of the mechanism, due to the spacing apart of the pivoting axes of the control button and pawl, and this involes an increase in the weight and cost of the reel.

An object of the invention is to provide a pawl mechanism with the same advantageous operation as that of the first mentioned reel but which can be made with a reduced bulk and can therefore be incorporated in a relatively compact reel housing.

This is achieved, in general terms, by pivotally mounting the external control member about the same pivoting axis as the pawl.

In more specific terms, the invention provides, in a fishing reel comprising a casing and a ratchet mounted for rotation in the casing, a pawl mechanism for controlling one-way rotation of the ratchet, comprising:

a pawl pivotally mounted in the casing for movement about a pivoting axis between a first position in operative engagement with the ratchet to allow one-way rotation of the ratchet and a second position disengaged from the ratchet;

an external manual control member pivotally mounted on the casing about said pivoting axis of the pawl for movement relative to the pawl;

stop means for limiting pivotal movement of said member between a first position and a second position;

a piece disposed within said casing and being secured to said control member for rotation therewith;

elongate spring means for moving said pawl between its first and second positions and second positions in response to a corresponding movement of said control member between its first and second positions, said spring means having first and second ends and being elastically deformable along the direction between its first and second ends;

means for securing the first end of said spring means to said piece at a first location eccentric to said pivoting axis;

and means for securing the second end of said spring means to the pawl at a second location eccentric to said pivoting axis, said first and second locations being so disposed that during movement of said control member from its first to its second position and from its second to its first position the line joining said first and second locations passes through said pivoting axis. A preferred embodiment of the invention will now be described, by way of example, with reference to the accompanying drawings, in which.

Figure 1:
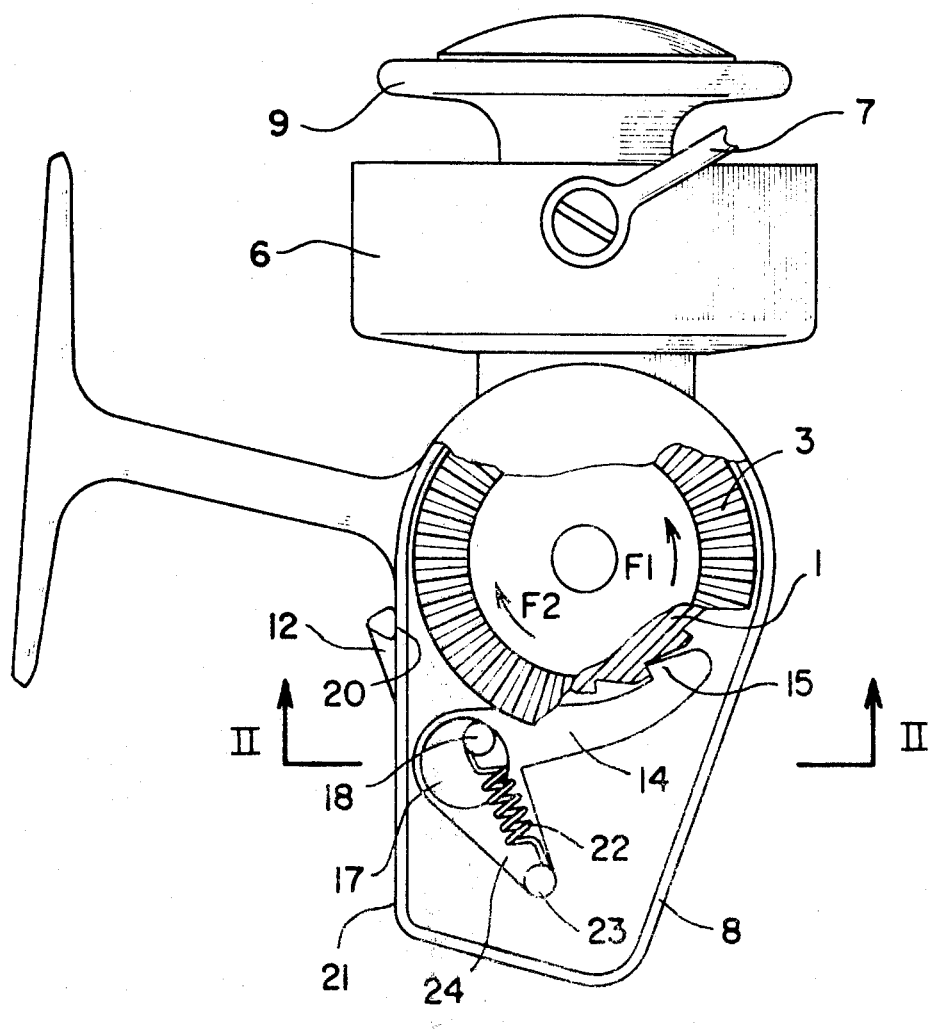
FIG. 1 is a side elevational view of a fishing reel with part of the casing cut-away.
Figure 2:
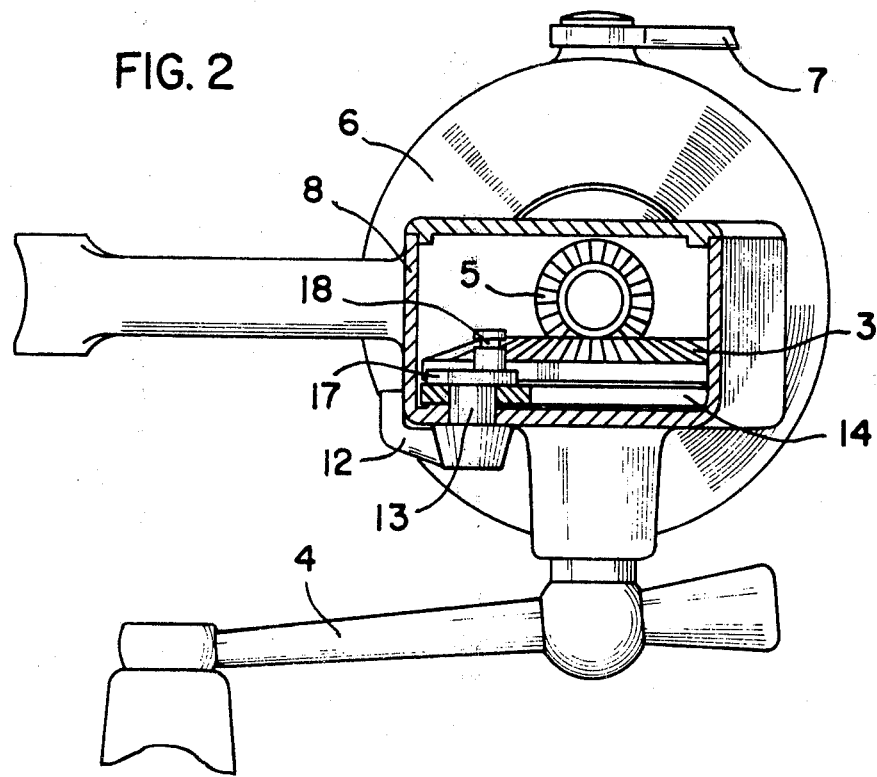
FIG. 2 is a cross-section taken along line II—II of FIG. 1.

The fishing reel shown in FIGS. 1 and 2 comprises a ratchet 1 integral with a toothed crown 3 adapted to be driven by a crank handle 4. The crown 3 is mounted for rotation in a casing 8 supporting a stationary line spool 9 integral therewith. The crown 3 meshes with a gear 5 fixed on a winding cup 6 carrying a bail pick-up 7. An external control lever 12 is pivotally mounted on the casing 8 by means of a cylindrical shaft 13 integral with lever 12, and passing through a bearing-forming opening in the wall of casing 8. The lever can adopt two extreme angular positions bearing against two fixed stops formed in the example shown by points 20 and 21 of the casing 8. The cylindrical shaft 13 also serves as pivoting shaft for a pawl 14 having a beak 15 able to engage with the teeth of ratchet 1. The shaft 13 carries at its inner end a disc 17 carrying a pin 18 disposed eccentric to the axis of shaft 13. An elongate traction spring 22 is hooked by one of its ends to pin 18 and by its other end to a pin 23 on a second arm 24 of pawl 14, extending from the pivoting axis generally transverse to the arm carrying beak 15. The pawl 14 can pivot to bring its beak 15 out of engagement with ratchet 1 and into engagement with a fixed stop formed in this example by a point 25 on the wall of casing 8. The pin 18 is angularly disposed on disc 17 in such a manner that when the control lever 12 is in an intermediate position between its two stops 20 and 21, and when the pawl 14 is also in an intermediate position between its extreme engaged and disengaged positions, the pins 18 and 23 are disposed along a straight line passing through the common pivoting axis (i.e. the axis of shaft 13). Moreover, as the pin 18 is on the part of the disc 18 disposed furthest away from pin 23, in this intermediate position the spring 22 is more stretched than when the lever 12 is in either extreme position against the stops 20 or 21. This intermediate position is thus a position of unstable equilibrium both for the control lever 12 and for pawl 14.

Figure 3:
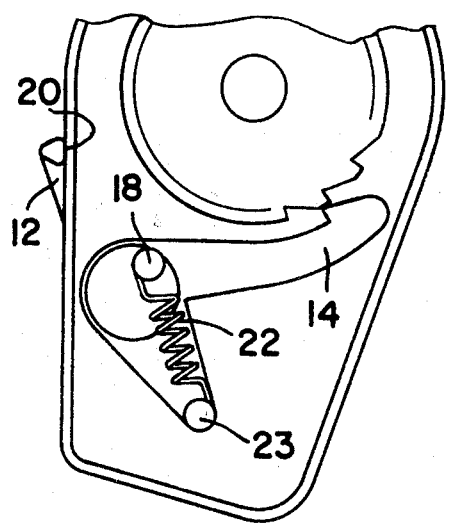
FIGS. 3 and 4 are views corresponding to a part of FIG. 1, showing the pawl in different positions during operation.

In operation, when the pawl 14 is in the position of FIG. 1, and the control lever 12 bears against stop 20, the beak 15 of pawl 14 is held in engagement with the teeth of ratchet 1 under the action of spring 22 whose pin 18 is disposed, in relation to a straight line passing through pin 23 and the axis of shaft 13 (and hence pawl 14), towards the ratchet 1. The control lever 12 is also held against stop 20 by spring 22. In this position, despite any tension applied on the line, the ratchet is prevented by means of pawl 14 from turning in direction F 1; to the contrary, if the angler acts on the crank handle 4 to turn crown 3 in direction F2, the ratchet teeth move the beak 15 of ratchet 14 as shown in FIG. 3 so that the ratchet 1 and crown 3 are able to rotate in this direction. However, the beak 15 of pawl 14 is constantly urged against the ratchet 1 by means of the spring 22 whose attachment pin 18 remains in the same position.

Figure 4:
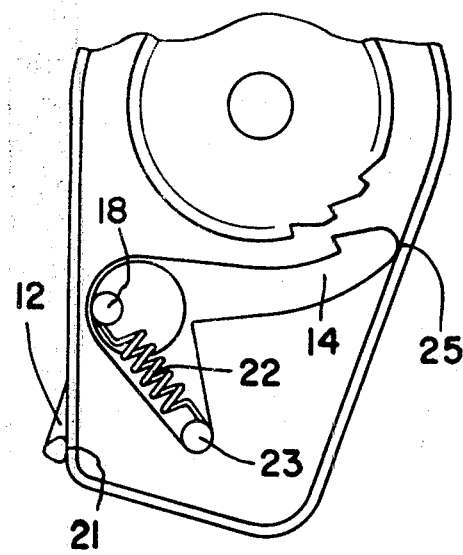

To disengage the pawl 14, the angler moves the control lever 12 to the position shown in FIG. 4. When the lever 12 has been moved over about a half of its angular path, the pin 18 comes to be located on the other side of the straight line passing through the axis of shaft 13 and pin 23. The pawl 14 then tends to move away from the ratchet 1 to come into abutment with its stop 25. If the line is not under tension, the pawl 14 immediately disengages from the ratchet. However, if the line is under tension (i.e. exerting a torque on crown 3 in direction F1), the pawl 14 remains held in engagement with the ratchet 1 by cooperation of the ratchet teeth with beak 15, until the moment when the tension ceases whereupon the pawl 14 is freed. The rotation of lever 12 continues until it abuts against stop 21 under the action of spring 22.

To return to the "engaged" position, the lever 12 is pivoted back to abut against stop 20, this movement causing engagement of the pawl 14 with ratchet 1 once the pin 18 has crossed the straight line passing through pin 23 and the axis of shaft 13. The components are thus all returned to their initial position as shown in FIG. 1. Instead of a traction spring 22, it would be possible to use a compression spring, by suitably changing the location of pin 18.

The invention is applicable in particular to lightweight fishing reels of small volume where it is nevertheless desired to have a one-way pawl and ratchet mechanism which can be easily disengaged even when the line is under tension.

What is claimed is:

1. In a fishing reel comprising a casing and ratchet mounted for rotation in the casing, a pawl mechanism for controlling one-way rotation of the ratchet, said pawl mechanism comprising:

a pawl pivotally mounted in the casing for movement about a pivoting axis between a first position in operative engagement with the ratchet to allow one-way rotation of the ratchet and a second position disengaged from the ratchet;

an external manual control member pivotally mounted on the casing about said pivoting axis of the pawl for movement relative to the pawl;

stop means for limiting pivotal movement of said member between a first postion and a second position;

a piece disposed within said casing and being secured to said control member for rotation therewith;

elongate spring means for moving said pawl between its first and second positions in response to a corresponding movement of said control member between its first and second positions, said spring means having first and second ends and being elastically deformable along the direction between its first and second ends;

means for securing the first end of said spring means to said piece at a first location eccentric to said pivoting axis;

and means for securing the second end of said spring means to the pawl at a second location eccentric to said pivoting axis, said first and second locations being so disposed that during movement of said control member from its first to its second position and from its second to its first position the line joining said first and second locations passes through said pivoting axis.

2. A fishing reel according to claim 1, in which said control member is securely fixed on a shaft having a disc secured thereon within the casing, said disc carrying a first pin disposed at said first location generally parallel to and spaced apart from the pivoting axis of said shaft, and in which the pawl is pivotally mounted on said shaft and has a first elongate arm for engagement with the ratchet and a second elongate arm extending from said pivoting axis generally transverse to said first elongate arm and beyond the periphery of said disc, said second arm carrying a second pin at said second location generally parallel to and spaced apart from said pivoting axis by a greater amount than is said first pin, said spring means being connected between said first and second pins.

3. A fishing reel according to claim 2, comprising further stop means for defining the second position of the pawl and for limiting pivotal movement of the pawl from its first to its second positions over a smaller angular path than that of the control member between its first and second positions.

* * * * *